United States Patent
DeSimone et al.

(10) Patent No.: US 8,391,186 B2
(45) Date of Patent: Mar. 5, 2013

(54) VOIP DIAL PLAN ANALYSIS AND IMPROVEMENT BASED ON DESIGN PATTERNS

(75) Inventors: George A. DeSimone, Yorktown Heights, NY (US); Shang Qing Guo, Cortlandt Manor, NY (US); William Joseph Rippon, Putnam Valley, NY (US); Zon-Yin Shae, South Salem, NY (US); Kunwadee Sripanidkulchai, White Plains, NY (US); Shu Tao, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 384 days.

(21) Appl. No.: 12/696,700

(22) Filed: Jan. 29, 2010

(65) Prior Publication Data
US 2011/0188649 A1    Aug. 4, 2011

(51) Int. Cl.
*H04L 12/28* (2006.01)
*H04M 7/00* (2006.01)
(52) U.S. Cl. .................................. 370/256; 379/221.15
(58) Field of Classification Search ........................ None
See application file for complete search history.

(56) References Cited

U.S. PATENT DOCUMENTS

| | | | | |
|---|---|---|---|---|
| 5,333,188 A * | 7/1994 | Bogart et al. | ............ | 379/221.14 |
| 5,623,541 A * | 4/1997 | Boyle et al. | .................... | 370/256 |
| 5,887,058 A * | 3/1999 | Kammath et al. | ............ | 379/284 |
| 6,324,272 B1 * | 11/2001 | Abu-Shukhaidem et al. | ........................ | 379/142.06 |
| 2003/0231759 A1 * | 12/2003 | Bedingfield et al. | ...... | 379/355.01 |
| 2005/0114655 A1 * | 5/2005 | Miller et al. | .................. | 713/163 |
| 2005/0273464 A1 * | 12/2005 | Brown et al. | ................. | 707/100 |
| 2008/0175370 A1 * | 7/2008 | Elharrar | .................. | 379/221.14 |
| 2009/0048996 A1 * | 2/2009 | Bala | ............................... | 706/46 |
| 2011/0038471 A1 * | 2/2011 | Gopalakrishna | ......... | 379/201.01 |
| 2011/0051715 A1 * | 3/2011 | Grunwald et al. | ............ | 370/352 |

\* cited by examiner

*Primary Examiner* — Timothy J Weidner
(74) *Attorney, Agent, or Firm* — Yee & Associates, P.C.; Louis J. Percello

(57) ABSTRACT

A computer implemented method that analyzes and improves a dial plan. A dial plan design template system receives an existing dial plan. The dial plan design template system models the existing dial plan as a directed graph. The dial plan design template system analyzes the directed graph to determine compliance with a set of edge rules. The dial plan design template system analyzes the directed graph to determine compliance with a set of connectivity type rules.

20 Claims, 8 Drawing Sheets

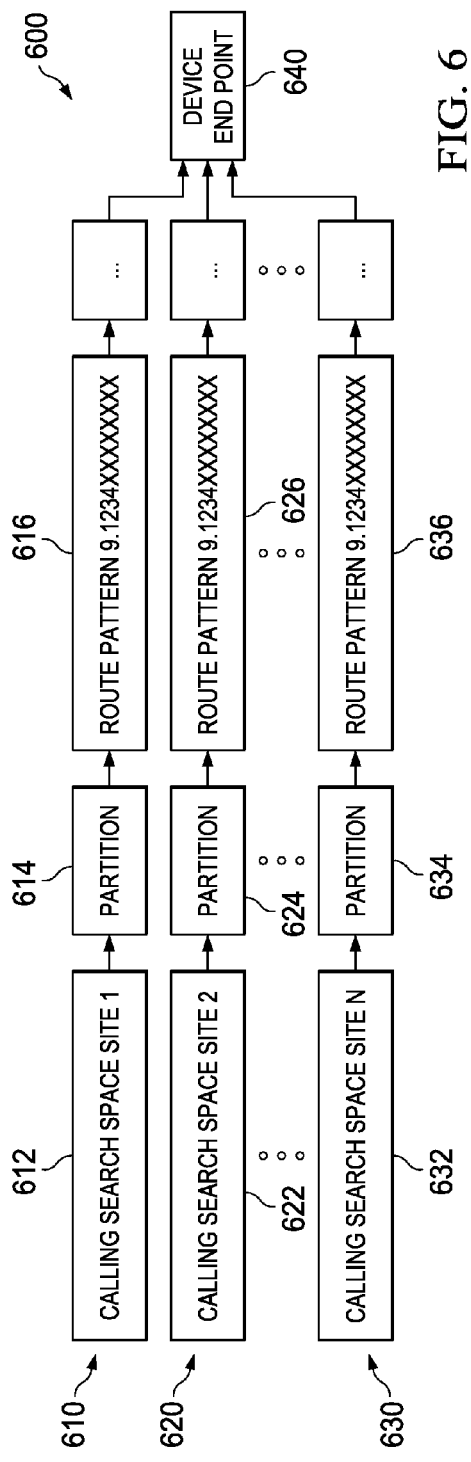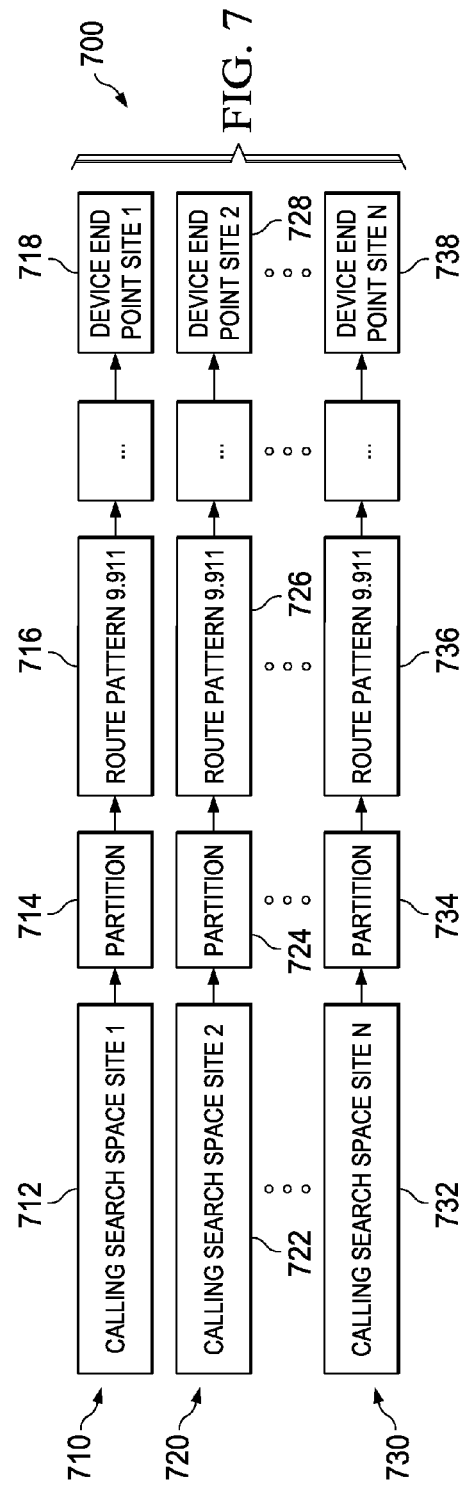

VOIP DIAL PLAN ANALYSIS AND IMPROVEMENT BASED ON DESIGN PATTERNS

BACKGROUND

1. Field

The disclosure relates generally to computer implemented methods, data processing systems, and computer storage media having computer usable instructions encoded thereon. More specifically, this disclosure relates to computer implemented methods, data processing systems, and computer storage media having computer usable instructions encoded thereon for voice over internet protocol dial plan analysis and improvement based on modeled design patterns.

2. Description of the Related Art

The Internet spans the whole world and one may find a place to connect to the Internet at just about every location in the world. Today many websites are audio enabled. Voice over IP (Internet Protocol) uses an IP protocol to send audio between one or more computers in real time, so that users may converse.

Voice over Internet Protocol (VoIP), is a technology that allows a user to make telephone calls using a broadband Internet connection instead of a regular (or analog) phone line. Some services using VoIP may only allow a user to call other people using the same service, but others may allow a user to call anyone who has a telephone number including local, long distance, mobile, and international numbers. Also, while some services only work over a PC (Personal Computer) or a special VoIP phone, other services allow a user to use a traditional phone through an adaptor.

VoIP allows users to make telephone calls by logging onto a computer network, over a data network like the Internet. VoIP converts voice signals from a user's telephone into a digital signal that travels over the Internet and then converts the digital signal back at the other end so that the user is capable of speaking to any other user with a regular phone number. When a user places a VoIP call by using a phone with an adapter, the user hears a dial tone and dials in a regular manner just as the user always has. VoIP may also allow the user to make calls directly from a computer using a conventional telephone or a microphone.

Depending on the service available, one way to place a VoIP call is to pick up a phone and dial the number by using an adaptor that connects to an existing high-speed Internet connection. The call goes through a local telephone company to a VoIP provider. The phone call goes over the Internet to the called party's local telephone company for the completion of the call. Another way is to utilize a microphone headset plugged into a computer. The number is placed using the keyboard and is routed through a cable modem. Therefore, a broadband (high speed Internet) connection is required. This can be through a cable modem, or high speed services such as DSL (Digital Subscriber Line) or a local area network (LAN). The user may hook up an inexpensive microphone to a computer and send voice data through a cable modem or connect a phone directly to a telephone adaptor.

In order to more efficiently route calls, many businesses and enterprises have established a dial plan that routes calls to various VoIP devices or to public switched telephone network (PSTN) However, establishing, maintaining, and upgrading a dial plan is difficult due to the disparate rules, routings, and other transformations that are often conglomerated together ad hoc.

SUMMARY

According to one embodiment, a computer implemented method analyzes and improves a dial plan. The dial plan design template system receives an existing dial plan. The dial plan design template system models the existing dial plan as a directed graph. The dial plan design template system analyzes the directed graph to determine compliance with a set of edge rules. The dial plan design template system analyzes the directed graph to determine compliance with a set of connectivity type rules. The rules used by the dial plan design template system can be generated by the system using the pattern extraction analyzer.

BRIEF DESCRIPTION OF THE SEVERAL VIEWS OF THE DRAWINGS

FIG. 6 is identified subgraphs extracted from a dial plan for implementing cost optimization is shown according to an illustrative embodiment;

FIG. 7 is identified subgraphs extracted from a dial plan for implementing performance optimization is shown according to an illustrative embodiment;

DETAILED DESCRIPTION

Figure 1:
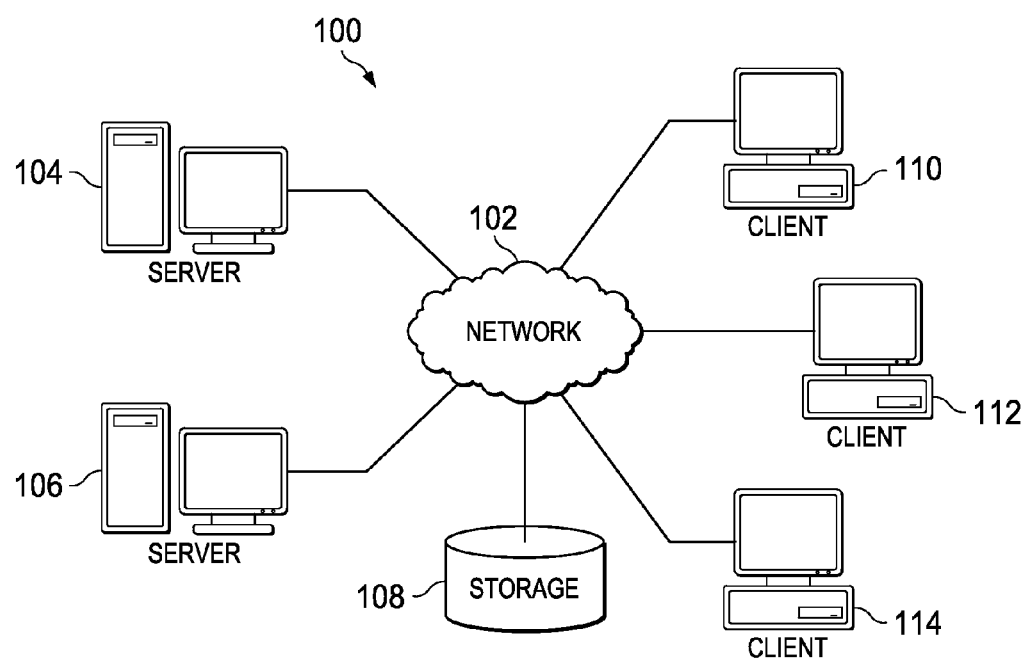
FIG. 1 is a pictorial representation of a network of data processing systems in which illustrative embodiments may be implemented.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 2:
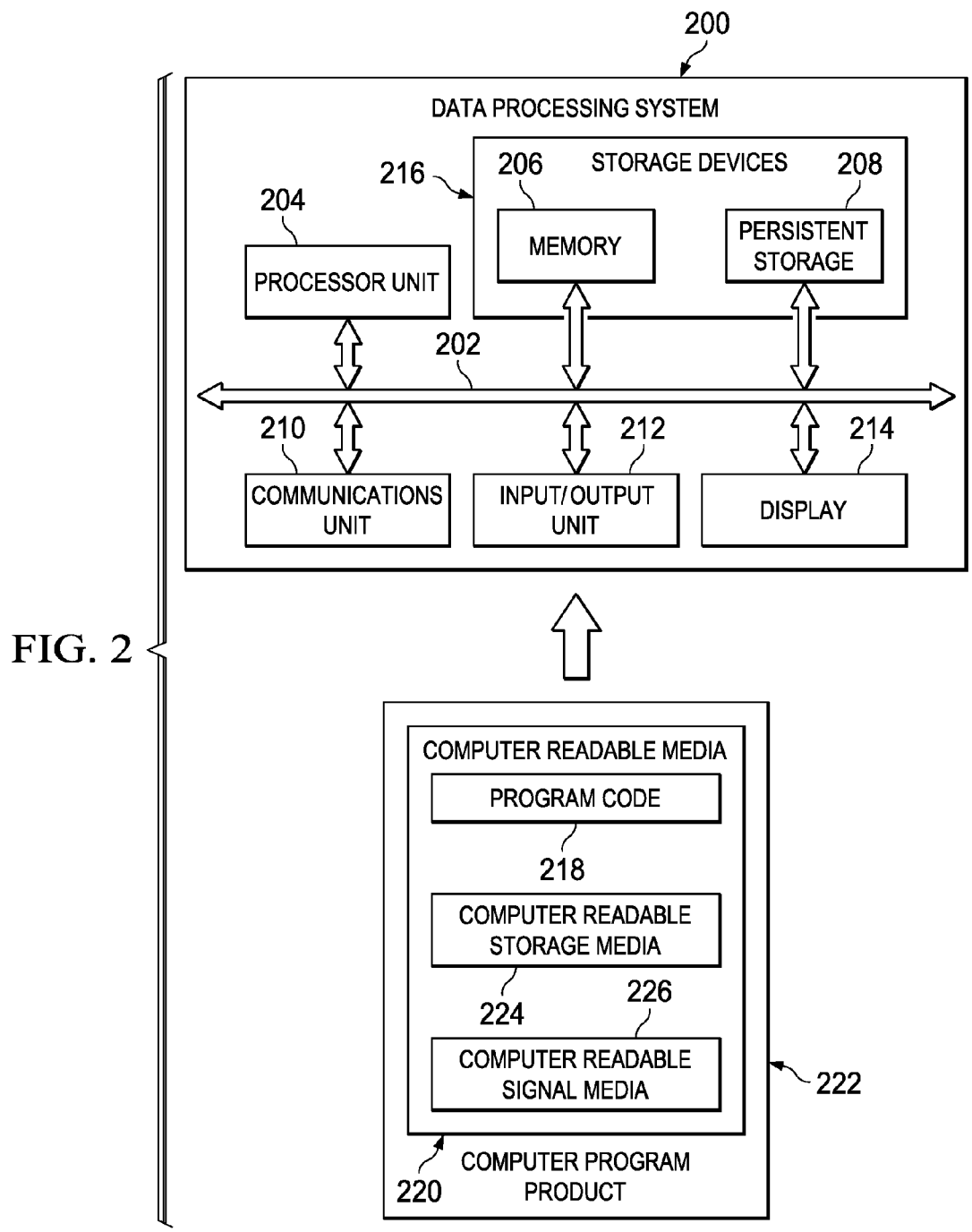
FIG. 2 is a diagram of a data processing system in accordance with an illustrative embodiment.

With reference now to the figures and in particular with reference to FIGS. 1 and 2, exemplary diagrams of data processing environments are provided in which illustrative embodiments may be implemented. It should be appreciated that FIGS. 1 and 2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip.

As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments described herein provide a computer implemented method that analyzes and improves a dial plan. The dial plan design template system receives an existing dial plan. The dial plan design template system models the existing dial plan as a directed graph. The dial plan design template system analyzes the directed graph to determine compliance with a set of edge rules. The dial plan design template system analyzes the directed graph to determine compliance with a set of connectivity type rules. The rules used by the dial plan design template system can be generated by the system using the pattern extraction analyzer.

Figure 3:
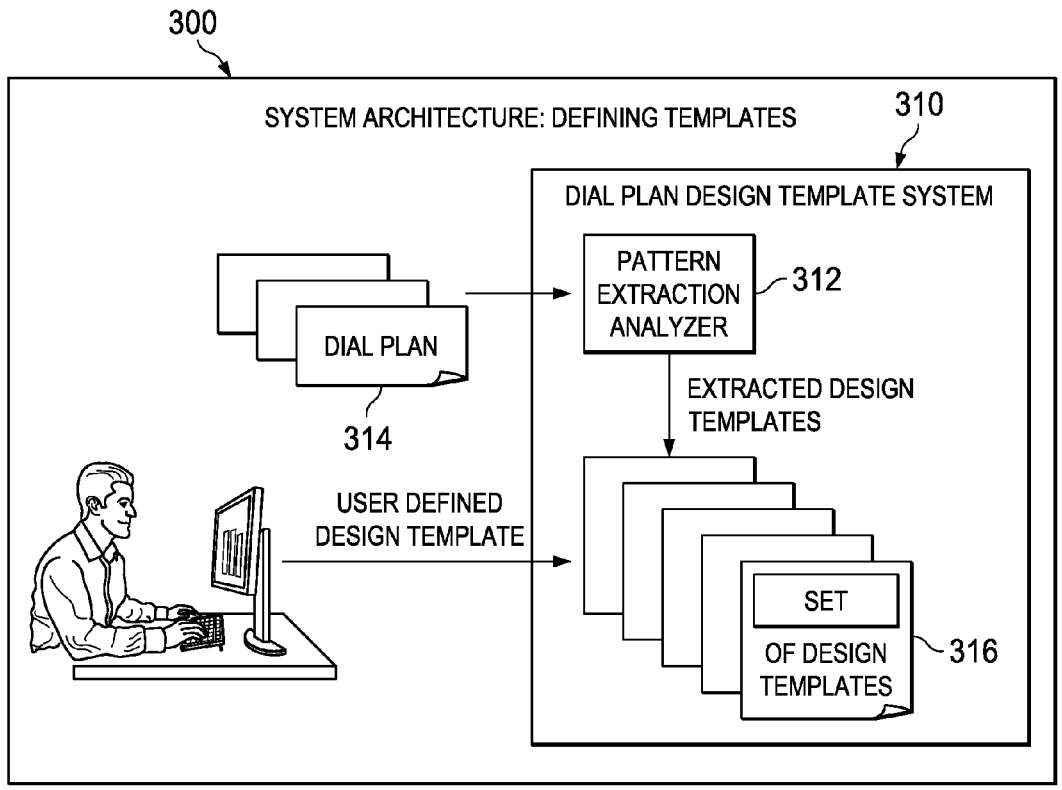
FIG. 3 is a dataflow for a dial plan template design and extraction system according to an illustrative embodiment.

Referring now to FIG. 3, a dataflow for a dial plan template design and extraction system is shown according to an illustrative embodiment. Dial plan design template system 310 is a data processing system, such as data processing system 200 of FIG. 2.

Dial plan design template system 310 executes pattern extraction analyzer 312. Pattern extraction analyzer 312 is a software system capable of analyzing existing dial plan 314 and extracting connectivity patterns therein. Pattern extraction analyzer 312 then stores the extracted connectivity patterns as one of the set of design templates 316.

Dial plan design template system 310 models existing dial plan 314 as a directed graph composed of configuration block vertices. Each of the configuration blocks represents a rule, routing, or device configuration that is used to route calls from a calling device to an appropriate endpoint device. Configuration blocks of the directed graph are connected to other configuration blocks by a set of incoming edges and a set of outgoing edges.

Each of set of design templates 316 characterizes properties of individual configuration blocks, or of a set of configuration blocks. These properties may include, but are not limited to, number of edges, connectivity patterns, and configuration block functionality. Each of set of design templates 316 may be a characterization of, for example, but not limited to, non-erroneous configurations, performance design goals, cost design goals, and modular design goals.

Set of design templates 316 is extracted or created. Ones of the set of design templates 316 can be extracted from an existing dial plan by pattern extraction analyzer 312. In the absence of a design template suitable for a user's design choice for the dial plan, a user can design others of the set of design templates 316 without extraction from existing dial plan 314.

By evaluating an existing dial plan for compliance with, or divergence from set of design templates 316, the set of design templates 316 can aid in assessing the overall design quality of the designed dial plan. Using set of design templates 316 as building blocks, new dial plans can be created. Existing dial plans can be modified into a clear, template-compliant dial plan that preserves call routing properties of the original dial plan.

Figure 4:
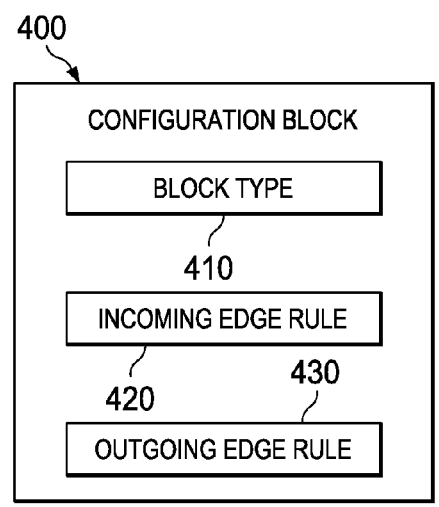
FIG. 4 is a configuration block according to an illustrative embodiment.

Referring now to FIG. 4, a configuration block is shown according to an illustrative embodiment. Configuration block 400 is a vertex within a directed graph created from a dial plan and stored as a design template, such as one of set of design templates 316 of FIG. 3.

Configuration block 400 includes block type 410. Block type 410 is a categorization of configuration block 400 based on properties or functionalities of configuration block 400. Block type 410 can be, for example, but not limited to, a partition, a calling search space, a route pattern, a route list, a route group, a translation pattern, a directory number, and a device end point.

A partition is a dial plan functionality that contains a list of route patterns, such as directory numbers and route patterns. Partitions facilitate call routing by dividing the route plan into logical subsets that are based on organization, location, and call type.

A calling search space is a dial plan functionality that comprises an ordered list of partitions that users can look at before users are allowed to place a call. Calling search spaces determine the partitions that calling devices, including internet protocol phones, soft phones, and gateways, can search when attempting to complete a call.

A route pattern is a dial plan functionality that comprises a string of digits and a set of associated digit manipulations that route calls to a route list or a gateway. Route patterns provide flexibility in network design. They work in conjunction with route filters and route lists to direct calls to specific devices and to include, exclude, or modify specific digit patterns.

A route list is a dial plan functionality that associates a set of route groups in a specified priority order. A route list then associates with one or more route patterns and determines the order in which those route groups are accessed. The order controls the progress of the search for available devices for outgoing calls.

A translation pattern is a dial plan functionality that manipulates dialed digits before it routes a call. In some cases, the system does not use the dialed number. In other cases, the public switched telephone network (PSTN) does not recognize the dialed number.

Configuration block 400 also includes incoming edges rule 420. Incoming edges rule 420 is a rule defining a number of other configuration blocks that can point to configuration block 400 within a directed graph of the dial plan. Depending on the specific block type, incoming edges rule 420 may require a minimum number of incoming edges, a maximum number of incoming edges, or combinations thereof. For example, if block type 410 is a "partition," incoming edges rule 420 may require a minimum of at least one incoming edge while allowing up to an infinite number of incoming edges.

Configuration block 400 also includes outgoing edges rule 430. Outgoing edges rule 430 is a rule defining a number of other configuration blocks that configuration block 400 can point to within a directed graph of the dial plan. Depending on the specific block type, outgoing edges rule 430 may require a minimum number of incoming edges, a maximum number of incoming edges, or combinations thereof. For example, if block type 410 is a "partition," outgoing edges rule 430 may require a minimum of at least one outgoing edge while allowing up to an infinite number of outgoing edges.

Figure 5:
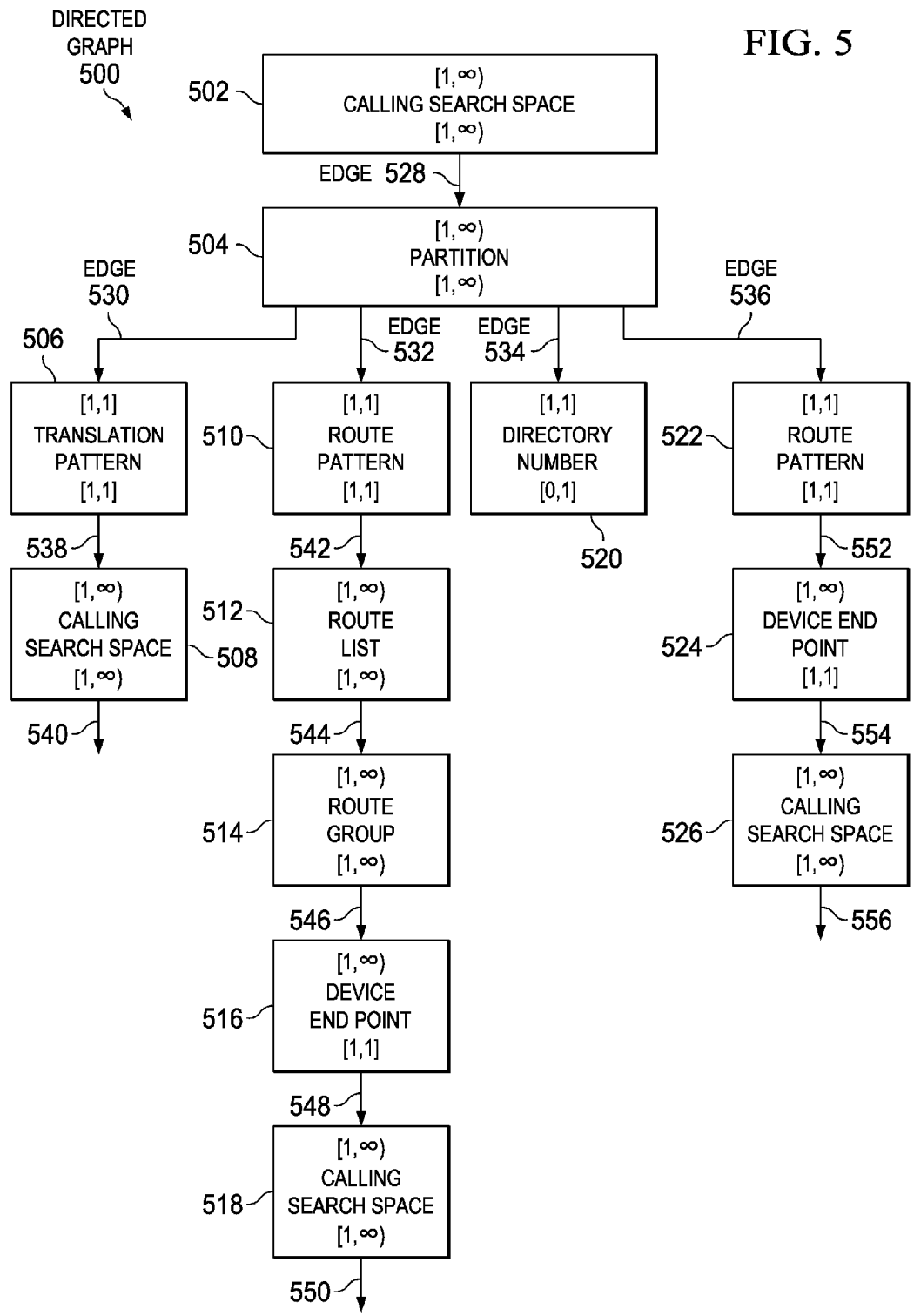
FIG. 5 is a simplified directed graph of a dial plan according to an illustrative embodiment.

Referring now to FIG. 5, a simplified directed graph of a dial plan is shown according to an illustrative embodiment. Directed graph 500 is comprised of a plurality of configuration blocks connected by edges. Configuration blocks 502-526 are configuration blocks such as configuration block 400 of FIG. 4.

Configuration block 502 has a block type of "calling search space." The block type "calling search space" incoming edge rule indicates that configuration block 502 may have a minimum of one incoming edges. Configuration block 502 has one incoming edges. Therefore, the number of incoming edges is compliant with the incoming edge rule for configuration block 502. The "calling search space" outgoing edge rule indicates that configuration block 502 may have a minimum of one outgoing edges. Configuration block 502 has one outgoing edge, edge 528. Therefore, the number of outgoing edges is compliant with the outgoing edge rule for configuration block 502.

Configuration block 504 has a block type of "partition." The block type "partition" incoming edge rule indicates that configuration block 504 may have a minimum of one incoming edges. Configuration block 504 has one incoming edge, edge 528. Therefore, the number of incoming edges is compliant with the incoming edge rule for configuration block 504. The "partition" outgoing edge rule indicates that configuration block 504 may have a minimum of one outgoing edges. Configuration block 504 has four outgoing edges, edge 530, edge 532, edge 534, and edge 536. Therefore, the number of outgoing edges is compliant with the outgoing edge rule for configuration block 504.

Configuration block 506 has a block type of "translation pattern." The block type "translation pattern" incoming edge rule indicates that configuration block 504 may have only one of incoming edges. Configuration block 506 has one incoming edge, edge 530. Therefore, the number of incoming edges is compliant with the incoming edge rule for configuration block 506. The "translation pattern" outgoing edge rule indicates that configuration block 506 may have only one outgoing edges. Configuration block 506 has one outgoing edge, edge 538. Therefore, the number of outgoing edges is compliant with the outgoing edge rule for configuration block 506.

Configuration block 508 has a block type of "calling search space." Configuration block 508 therefore shares a common block type with configuration block 502. Because configuration block 508 and configuration block 502 are a common block type, incoming edge rules and outgoing edge rules for the blocks are similar. Configuration block 508 has one incoming edge, edge 538, and one outgoing edge, edge 540. Therefore, configuration block 508 is compliant with both the incoming edge rule, and the outgoing edge rule for the "calling search space" block type. Edge 540 may point to additional configuration blocks.

Configuration block 510 has a block type of "route pattern." The block type "route pattern" incoming edge rule indicates that configuration block 510 may have only one incoming edges. Configuration block 510 has one incoming edge, edge 532. Therefore, the number of incoming edges is compliant with the incoming edge rule for configuration block 510. The "route pattern" outgoing edge rule indicates that configuration block 510 may have only one outgoing edges. Configuration block 510 has one outgoing edge, edge 542. Therefore, the number of outgoing edges is compliant with the outgoing edge rule for configuration block 510.

Configuration block 512 has a block type of "route list." The block type "route list" incoming edge rule indicates that configuration block 512 may have a minimum of one incoming edges. Configuration block 512 has one incoming edge, edge 542. Therefore, the number of incoming edges is compliant with the incoming edge rule for configuration block 512. The "route list" outgoing edge rule indicates that configuration block 512 may have a minimum of one outgoing edges. Configuration block 512 has one outgoing edge, edge 544. Therefore, the number of outgoing edges is compliant with the outgoing edge rule for configuration block 512.

Configuration block 514 has a block type of "route group." The block type "route group" incoming edge rule indicates that configuration block 514 may have a minimum of one incoming edges. Configuration block 514 has one incoming edge, edge 544. Therefore, the number of incoming edges is compliant with the incoming edge rule for configuration block 514. The "route group" outgoing edge rule indicates that configuration block 514 may have a minimum of one outgoing edges. Configuration block 514 has one outgoing edge, edge 546. Therefore, the number of outgoing edges is compliant with the outgoing edge rule for configuration block 514.

Configuration block 516 has a block type of "device end point." The block type "device end point" edge rule indicates that configuration block 516 may have a minimum of either one incoming or outgoing edges. Configuration block 516 has one incoming edge, edge 546. Therefore, the number of incoming edges is compliant with the edge rule for configuration block 516. Configuration block 516 has one outgoing edge, edge 548. Therefore, the number of outgoing edges is compliant with the edge rule for configuration block 516.

Configuration block 518 has a block type of "calling search space." Configuration block 518 therefore shares a common block type with configuration block 502. Because configuration block 518 and configuration block 502 are a common block type, incoming edge rules and outgoing edge rules for the blocks are similar. Configuration block 518 has one incoming edge, edge 548, and one outgoing edge, edge 550. Therefore, configuration block 518 is compliant with both the incoming edge rule, and the outgoing edge rule for the "calling search space" block type. Edge 550 may point to additional configuration blocks.

Configuration block 520 has a block type of "directory number." The block type "directory number" incoming edge rule indicates that configuration block 520 may have only one incoming edge. Configuration block 520 has one incoming edge, edge 534. Therefore, the number of incoming edges is compliant with the incoming edge rule for configuration block 520. The "directory number" outgoing edge rule indicates that configuration block 520 may not have any outgoing edges. Configuration block 520 does not have an outgoing edge. Therefore, the number of outgoing edges is compliant with the outgoing edge rule for configuration block 520.

Configuration block 522 has a block type of "route pattern." Configuration block 522 therefore shares a common block type with configuration block 510. Because configuration block 522 and configuration block 510 are a common block type, incoming edge rules and outgoing edge rules for the blocks are similar. Configuration block 522 has one incoming edge, edge 536, and one outgoing edge, edge 552. Therefore, configuration block 522 is compliant with both the incoming edge rule, and the outgoing edge rule for the "route pattern" block type.

Configuration block 524 has a block type of "device end point." Configuration block 524 therefore shares a common block type with configuration block 516. Because configuration block 524 and configuration block 516 are a common block type, incoming edge rules and outgoing edge rules for the blocks are similar. Configuration block 524 has one incoming edge, edge 552, and one outgoing edge, edge 554. Therefore, configuration block 524 is compliant with the edge rule for the "device end point" block type.

Configuration block 526 has a block type of "calling search space." Configuration block 526 therefore shares a common block type with configuration block 502. Because configuration block 526 and configuration block 502 are a common block type, incoming edge rules and outgoing edge rules for the blocks are similar. Configuration block 526 has one incoming edge, edge 554, and one outgoing edge, edge 556. Therefore, configuration block 526 is compliant with both the incoming edge rule, and the outgoing edge rule for the "calling search space" block type. Edge 556 may point to additional configuration blocks.

Additionally, edge rules might indicate that a particular configuration block type should always connect to a different configuration block type. For example, a particular dial plan might indicate that outgoing edges of a "calling search space" configuration block should always point to a "partition" block type, and therefore that incoming edges to the "partition" configuration block should always originate from a "calling search space" block type. The dial plan design template system analyzes edge connectivity between configuration blocks to determine compliance with any connectivity type requirements.

For each of configuration blocks 502 to 526, a dial plan design template checking and comparison system performs a type checking and degree checking for each of the connected configuration blocks. Thus, the dial plan design template system analyzes configuration blocks to determine compliance with the incoming edge rules and outgoing edge rules for the particular configuration blocks type.

Referring now to FIG. 6, identified subgraphs extracted from a dial plan for implementing cost optimization is shown according to an illustrative embodiment. A subgraph is a series of connected configuration blocks within the directed graph of a dial plan. Identified subgraphs 600 are extracted portions of a directed graph identified from a dial plan, such as existing dial plan 314 of FIG. 3. Subgraphs 600 are comprised of configuration blocks, such as configuration block 400 of FIG. 4.

Identified subgraph 600 includes subgraph 610, subgraph 620 and subgraph 630. Each of subgraphs 610, 620, and 630 are identified from the directed graph as conforming to a design template, such as one of set of design templates 316 of FIG. 3.

In an illustrative embodiment, each of subgraphs 610, 620, and 630 conform to a template having configuration block connectivity of a "calling search space" to "partition" to a specific "route pattern." Subgraph 610 includes the directed configuration block 612, configuration block 614, and configuration block 616. Configuration block 612 has a block type of "calling search space," similar to configuration block 502 of FIG. 5. Configuration block 612 must therefore conform to any incoming edge rules, outgoing edge rules, and connectivity rules for the block type of "calling search space." Configuration block 614 has a block type of "partition," similar to configuration block 504 of FIG. 5. Configuration block 614 must therefore conform to any incoming edge rules, outgoing edge rules, and connectivity rules for the block type of "partition." Configuration block 616 has a block type of "route pattern," similar to configuration block 510 of FIG. 5. Configuration block 616 must therefore conform to any incoming edge rules, outgoing edge rules, and connectivity rules for the block type of "route pattern."

Subgraph 620 and subgraph 630 contain configuration blocks similar to those found in subgraph 610. Configuration blocks 622, 624, and 626 of subgraph 620, and configuration blocks 632, 634, and 636 of subgraph 630 also must conform to any incoming edge rules, outgoing edge rules, and connectivity rules for the indicated block type.

By identifying common subgraphs that conform to one of the set of design templates, configuration blocks of the identified subgraphs can be duplicated within a dial plan to realize various cost and performance optimizations. In one illustrative embodiment, configuration blocks 616, 626, and 636 each share a common route pattern. A dialed number that includes the "9.1234" prefix is therefore directed to endpoint device 640. These dialed numbers are directed to endpoint device 640 regardless of whether the dialing originated from calling search space site 1, as indicated by configuration blocks 612, from a calling search space site 2, as indicated by configuration blocks 622, or from a calling search space site n, as indicated by configuration blocks 632.

In the illustrative example, when a subgraph is identified within the dial plan having a configuration block connectivity and the route pattern "9.1234" prefix, the dial plan can be modified such that the identified subgraph always points to endpoint device 640. In one illustrative example, endpoint device 640 can be a gateway located within a "234" telephone area code. Any calls from calling search sites 1, 2, or n will therefore exit the gateway as a local telephone call, regardless of the physical location of calling search sites 1, 2, or n.

Referring now to FIG. 7, identified subgraphs extracted from a dial plan for implementing performance optimization is shown according to an illustrative embodiment. Identified subgraphs 700 are extracted portions of a direct graph identified from a dial plan, such as existing dial plan 314 of FIG. 3. Subgraphs 700 are comprised of configuration blocks, such as configuration block 400 of FIG. 4.

Identified subgraphs 700 include subgraph 710, subgraph 720 and subgraph 730. Each of subgraphs 710, 720, and 730 are identified from the directed graph as conforming to a design template, such as one of set of design templates 316 of FIG. 3.

In an illustrative embodiment, each of subgraphs 710, 720, and 730 conform to a template having configuration block connectivity of a "calling search space" to "partition" to a specific "route pattern." Subgraph 710 includes the directed configuration blocks configuration block 712, configuration block 714, and configuration block 716. Configuration block 712 has a block type of "calling search space," similar to configuration block 502 of FIG. 5. Configuration block 712 must therefore conform to any incoming edge rules, outgoing edge rules, and connectivity rules for the block type of "calling search space." Configuration block 714 has a block type of "partition," similar to configuration block 504 of FIG. 5. Configuration block 714 must therefore conform to any incoming edge rules, outgoing edge rules, and connectivity rules for the block type of "partition." Configuration block 716 has a block type of "route pattern," similar to configuration block 510 of FIG. 5. Configuration block 716 must therefore conform to any incoming edge rules, outgoing edge rules, and connectivity rules for the block type of "route pattern."

Subgraph 720 and subgraph 730 contain configuration blocks similar to those found in subgraph 710. Configuration blocks 722, 724, and 726 of subgraph 720, and configuration blocks 732, 734, and 736 of subgraph 730 also must conform to any incoming edge rules, outgoing edge rules, and connectivity rules for the indicated block type.

By identifying common subgraphs that conform to one of the set of design templates, configuration blocks of the identified subgraphs can be duplicated within a dial plan to realize various cost and performance optimizations. In one illustrative embodiment, configuration blocks 716, 726, and 736 each share a common route pattern. In contrast to the optimization of FIG. 6, a dialed number that includes the "9.911" prefix is therefore directed to separate ones of endpoint devices as indicated in configuration blocks 718, 728, or 738. The endpoint devices are selected depending on the originating calling space site, as indicated in one of configuration blocks 712, 722, or 732. Thus, dialed numbers are directed to an endpoint device local to the origination of the call from calling search space site 1. Calls originating from calling search space site 1 exit at device end point site 1. Calls originating from calling search space site 2 exit at device end point site 2. Calls originating from calling search space site n exit at device end point site n.

In the illustrative embodiment, when a subgraph is identified within the dial plan having a configuration block connectivity and the route pattern "9.911," the dial plan can be modified such that the identified in configuration blocks 716, 726, or 730. When identified subgraphs within the dial plan match this template, the dial plan can be modified to ensure that calls matching the indicated route pattern will always be preferentially routed to an end point device local to the call origination.

Figure 8:
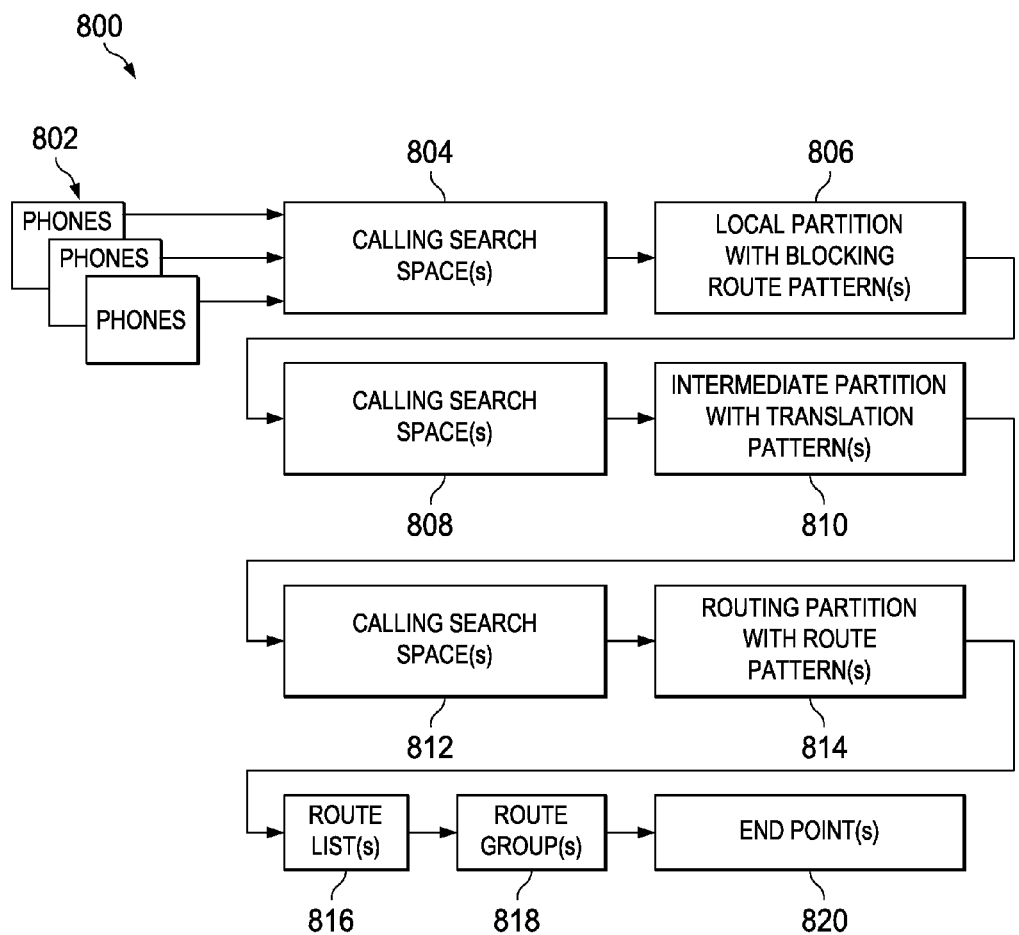
FIG. 8 is an exemplary simplified directed graph of a dial plan showing a hierarchical partition design according to an illustrative embodiment.

Referring now to FIG. 8, an exemplary simplified directed graph of a dial plan showing a hierarchical partition design is shown according to an illustrative embodiment. Directed graph 800 is comprised of a plurality of configuration blocks connected by edges. Configuration blocks 804-820 are configuration blocks such as configuration block 400 of FIG. 4. By utilizing modular design, design templates of the illustrative embodiments can improve modularity and maintainability for the dial plan.

Each of configuration blocks 804-820 has a clearly defined, single function. The modular, one-function design allows for an ease of maintainability between operators, administrators and developers of the dial plan.

In the illustrative embodiment of directed graph 800, calls from phones 802 are assigned to the calling search space of configuration block 804. Calls within calling search space 804 are routed to the local partition of configuration block 806. Configuration block 806 is a "local" partition, used to set access rights and permissions for user phones and devices.

After access rights and permissions are set, calls are assigned to a subsequent calling search space of configuration block 808. Calls within calling search space 808 are routed to the intermediate partition of configuration block 810. Configuration block 810 is an "intermediate partition" used to perform digit translation. "intermediate partitions" are not connected to routing elements.

After any digit translation is performed, calls are assigned to a subsequent calling search space of configuration block 812. Calls within calling search space 812 are routed to the routing partition of configuration block 814. Configuration block 814 is a "routing partition" used to route calls to endpoint devices, such as, but not limited to, trunks or gateways.

In the illustrative embodiment, calls in the routing partition of configuration block 814 are directed through the route list of configuration block 816, and the route group of configuration block 818 before reaching end point device 820. The modular design of directed graph 800 ensures that operators, administrators and developers of the dial plan can easily ascertain the functionality of each of the configuration blocks. By utilizing modular design, design templates of the illustrative embodiments can improve modularity and maintainability for the dial plan.

Figure 9:
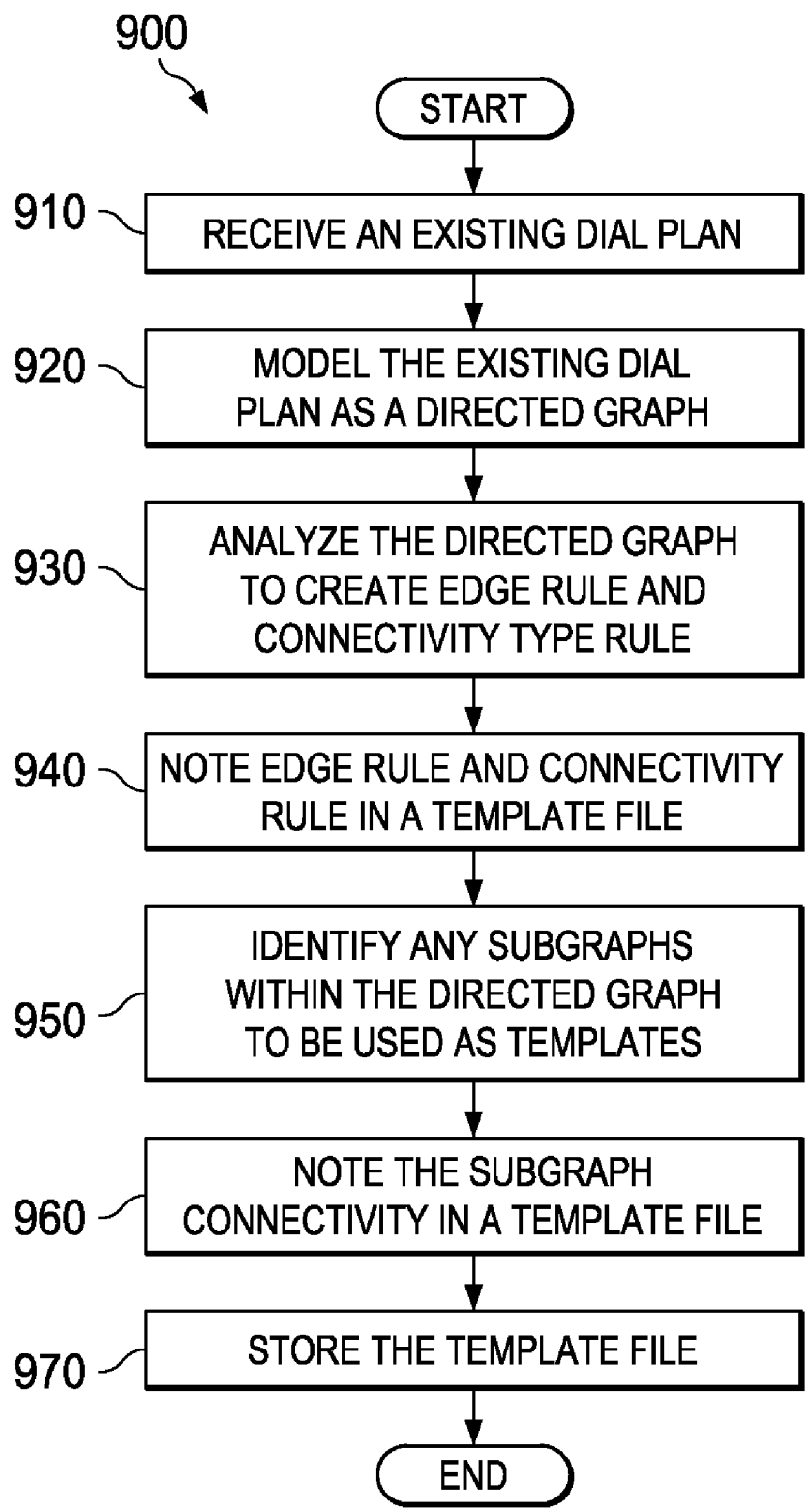
FIG. 9 is a flowchart for a dial plan template design and extraction system according to an illustrative embodiment.

Referring now to FIG. 9, a flowchart for a dial plan template design and extraction system is shown according to an illustrative embodiment. Process 900 is a software process, executing on a software system, such as dial plan template system 310 of FIG. 3.

Process 900 begins by receiving an existing dial plan (step 910). The dial plan can be existing dial plan 314 of FIG. 3.

Process 900 models the existing dial plan as a directed graph (Step 920). The directed graph can be a directed graph such as directed graph 500 of FIG. 5. The directed graph is comprised of configuration blocks, connected by edges. Each configuration block of the directed graph is a configuration block such as configuration block 400 of FIG. 4. The directed graph can be modeled having a modular design, such as directed graph 800 of FIG. 8. By utilizing modular design, design templates of the illustrative embodiments can improve modularity and maintainability for the dial plan.

Process 900 analyzes the directed graph to create edge rule and connectivity type rule (step 930). Depending on the specific block type, an incoming edge rule may require a minimum number of incoming edges, a maximum number of incoming edges, or combinations thereof. Also, an outgoing edge rule may require a minimum number of incoming edges, a maximum number of incoming edges, or combinations thereof.

Process 900 then notes edge rule and connectivity type rule in a template file (step 940). The template file such as one of set of design templates 316 of FIG. 3. The template file characterizes properties of individual configuration blocks of the directed graph, or of a set of configuration blocks. These properties may include, but are not limited to, number of edges, connectivity patterns, and configuration block functionality. The template file may be a characterization of, for example, but not limited to, non-erroneous configurations, performance design goals, cost design goals, and modular design goals.

Additionally, dial plans might indicate that a particular configuration block type should always connect to a different configuration block type. For example, a particular dial plan might indicate that outgoing edges of some or all "partition" configuration blocks should always point to a "route pattern" block type, and therefore that incoming edges to the "route pattern" configuration block should always originate from a "partition" block type. The dial plan design template system analyzes edge connectivity between configuration blocks to determine compliance with any connectivity type requirements.

Process 900 then identifies any subgraphs within the directed graph to be used as templates (step 950). The identified subgraphs are extracted portions of the directed graph. The identified subgraphs are identified from the directed graph as conforming to a design template, such as one of set of design templates 316 of FIG. 3.

Process 900 notes the subgraph connectivity in a template file (step 960). The identified subgraph can then be used for the analysis of subsequently examined call directed graphs. Process 900 then stores the template file (step 970), with the process terminating thereafter. The template file is stored as a design template, such as one of set of design templates 316 of FIG. 3.

Figure 10:
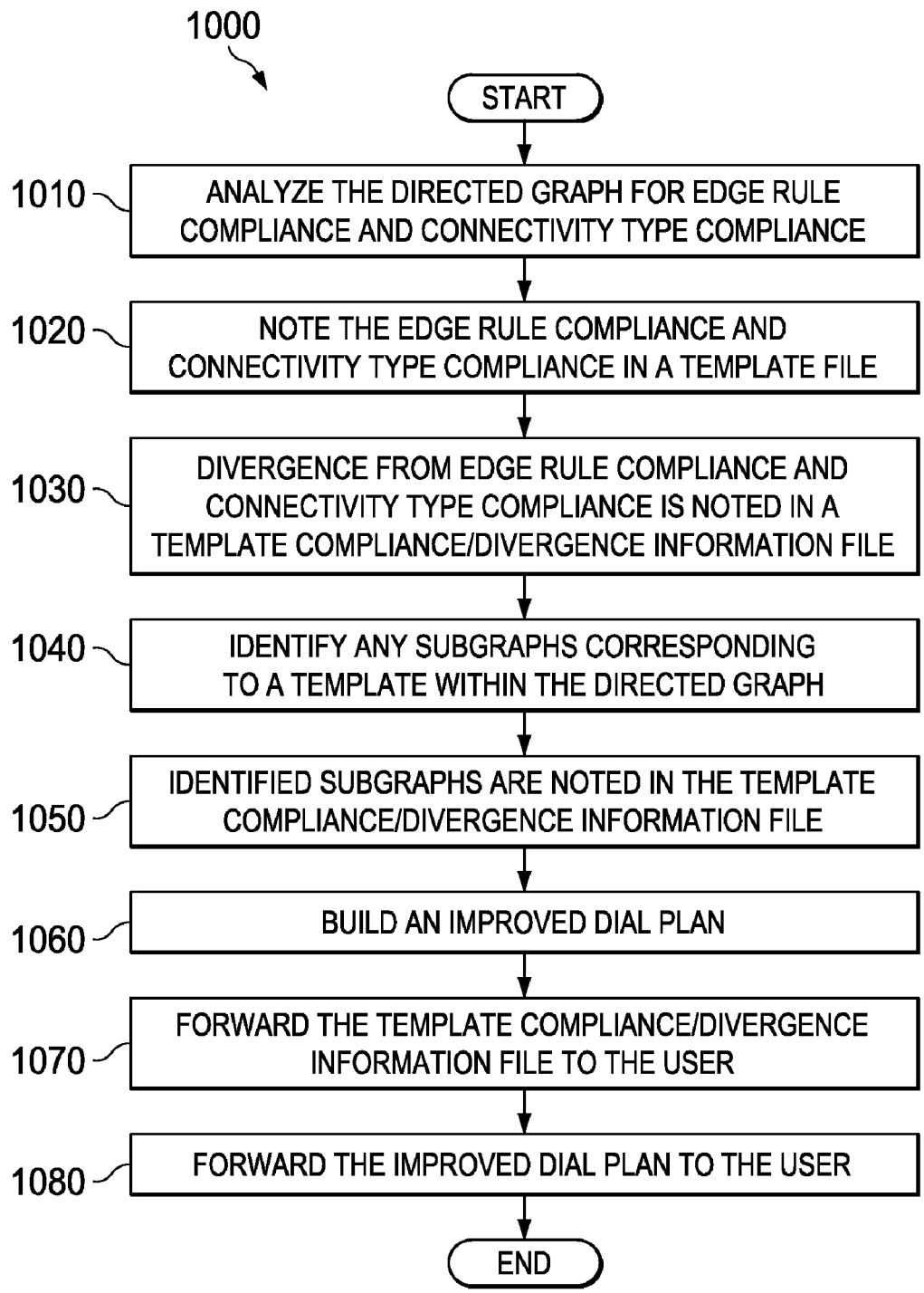
FIG. 10 is a flowchart for a dial plan template checking and comparison system according to an illustrative embodiment.

Referring now to FIG. 10, a flowchart for a dial plan template checking and comparison system is shown according to an illustrative embodiment. Process 1000 is a software process, executing on a software system, such as dial plan template system 310 of FIG. 3.

Process 1000 begins by analyzing the directed graph for edge rule compliance, and connectivity type compliance (step 1010). Depending on the specific block type, an incoming edge rule may require a minimum number of incoming edges, a maximum number of incoming edges, or combinations thereof. Also an outgoing edge rule may require a minimum number of incoming edges, a maximum number of incoming edges, or combinations thereof.

Process 1000 then notes edge rule compliance, and connectivity type compliance in a template file (step 1020). The template file such as one of set of design templates 316 of FIG. 3. The template file characterizes properties of individual configuration blocks of the directed graph, or of a set of configuration blocks. These properties may include, but are not limited to, number of edges, connectivity patterns, and configuration block functionality. The template file may be a characterization of, for example, but not limited to, non-erroneous configurations, performance design goals, cost design goals, and modular design goals.

Additionally, dial plans might indicate that a particular configuration block type should always connect to a different configuration block type. For example, a particular dial plan might indicate that outgoing edges of some or all "partition" configuration block should always point to a "route pattern" block type, and therefore that incoming edges to the "route pattern" configuration block should always originate from a "partition" block type. The dial plan design template system analyzes edge connectivity between configuration blocks to determine compliance with any connectivity type requirements. Divergence from edge rule compliance, and connectivity type compliance is noted in a template compliance/divergence information file (step 1020).

Process 1000 identifies any subgraphs corresponding to a template within the directed graph (step 1030). By identifying common subgraphs that conform to one of the set of design templates, configuration blocks of the identified subgraphs can be duplicated within a dial plan to realize various cost and performance optimizations. Any identified subgraphs are noted in the template compliance/divergence information file (step 1040).

Process 1000 then optionally builds an improved dial plan (step 1050). The improved dial plan rectifies any non-compliances for edge rule compliance, and connectivity type compliance. The improved dial plan may also incorporate identified common subgraphs in lieu of configuration blocks having similar functionality. Process 1000 forwards the template compliance/divergence information file to the user (step 1060), and optionally also forwards the improved dial plan to the user (step 1070), with the process terminating thereafter.

Thus, the illustrative embodiments described herein provide a computer implemented method that analyzes and improves a dial plan. The dial plan design template system receives an existing dial plan. The dial plan design template system models the existing dial plan as a directed graph. The dial plan design template system analyzes the directed graph to determine compliance with a set of edge rules. The dial plan design template system analyzes the directed graph to determine compliance with a set of connectivity type rules. The rules used by the dial plan design template system can be generated by the system using the pattern extraction analyzer.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for analyzing a dial plan, comprising the computer implemented steps of:

receiving, by a computer, an existing dial plan;

modeling, by the computer, the existing dial plan as a directed graph, wherein the step of modeling the existing dial plan as a directed graph further comprises: identifying a block type for each of a set of configuration blocks of the directed graph; identifying a number of incoming edges for each of the set of configuration blocks of the directed graph, wherein an incoming edge rule identifies a maximum number of incoming edges for the block type for each of the set of configuration blocks, and wherein the incoming edge rule identifies a minimum number of incoming edges for the block type for each of the set of configuration blocks; and identifying a number of outgoing edges for each of the set of configuration blocks of the directed graph; and analyzing, by the computer, the directed graph to determine compliance with a set of edge rules, wherein the step of analyzing the directed graph to determine compliance with a set of edge rules further comprises: determining whether the number of incoming edges for each of the set of configuration blocks complies with an incoming edge rule for the block type for each of the set of configuration blocks; and determining whether the number of outgoing edges for each of the set of configuration blocks complies with an outgoing edge rule for the block type for each of the set of configuration blocks; and analyzing, by the computer, the directed graph to determine compliance with a set of connectivity type rules.

2. The computer implemented method of claim 1, wherein the outgoing edge rule identifies a maximum number of outgoing edges for the block type for each of the set of configuration blocks, and wherein the outgoing edge rule identifies a minimum number of outgoing edges for the block type for each of the set of configuration blocks.

3. The computer implemented method of claim 1, wherein the step of analyzing the directed graph to determine compliance with a set of connectivity type rules further comprises:
identifying, by the computer, a first configuration block of the set of configuration blocks;
identifying, by the computer, a second configuration block of the set configuration blocks, wherein the second configuration block is pointed to from the first configuration block by one of the number of incoming edges;
determining, by the computer, that a block type of the second configuration block complies with one of the set of connectivity type rules for an outgoing edge of the number of outgoing edges for a block type of the first configuration block; and
determining, by the computer, that the block type of the first configuration block complies with one of the set of connectivity type rules for an incoming edge of the number of incoming edges for the block type of the second configuration block.

4. The computer implemented method of claim 1, wherein the step of modeling the existing dial plan as a directed graph further comprises:
identifying, by the computer, a number of subgraphs from the directed graph, wherein the number of subgraphs are identified by comparing the directed graph to a number of design templates.

5. The computer implemented method of claim 4, wherein the steps of analyzing the directed graph to determine compliance with a set of edge rules and analyzing the directed graph to determine compliance with a set of connectivity type rules further comprise:
analyzing, by the computer, the directed graph to determine compliance with a set of edge rules based on compliance of the number of subgraphs with the number of design templates; and
analyzing, by the computer, the directed graph to determine compliance with a set of connectivity type rules based on compliance of the number of subgraphs with the number of design templates.

6. The computer implemented method of claim 4 further comprising:
building, by the computer, a new dial plan, wherein the new dial plan rectifies any non-compliances for edge rule compliance, and connectivity type compliance; and
forwarding, by the computer, a template compliance and divergence information file to a user; and
forwarding, by the computer, the new dial plan to the user.

7. A non-transitory computer readable storage medium having computer executable program code for analyzing a dial plan encoded thereon, the non-transitory computer readable storage medium comprising:
instructions for receiving an existing dial plan;
instructions for modeling the existing dial plan as a directed graph, wherein the instructions for modeling the existing dial plan as a directed graph further comprises: instructions for identifying a block type for each of a set of configuration blocks of the directed graph; instructions for identifying a number of incoming edges for each of the set of configuration blocks of the directed graph; and instructions for identifying a number of outgoing edges for each of the set of configuration blocks of the directed graph;
instructions for analyzing the directed graph to determine compliance with a set of edge rules, wherein the instructions for analyzing the directed graph to determine compliance with a set of edge rules further comprises: instructions for determining whether the number of incoming edges for each of the set of configuration blocks complies with an incoming edge rule for the block type for each of the set of configuration blocks, wherein the incoming edge rule identifies a maximum number of incoming edges for the block type for each of the set of configuration blocks, and wherein the incoming edge rule identifies a minimum number of incoming edges for the block type for each of the set of configuration blocks; and instructions for determining whether the number of outgoing edges for each of the set of configuration blocks complies with an outgoing edge rule for the block type for each of the set of configuration blocks; and
instructions for analyzing the directed graph to determine compliance with a set of connectivity type rules.

8. The non-transitory computer readable storage medium of claim 7, wherein the outgoing edge rule identifies a maximum number of outgoing edges for the block type for each of the set of configuration blocks, and wherein the outgoing edge rule identifies a minimum number of outgoing edges for the block type for each of the set of configuration blocks.

9. The non-transitory computer readable storage medium of claim 7, wherein the instructions for analyzing the directed graph to determine compliance with a set of connectivity type rules further comprises:
instructions for identifying a first configuration block of the set of configuration blocks;
instructions for identifying a second configuration block of the set configuration blocks, wherein the second configuration block is pointed to from the first configuration block by one of the number of incoming edges;
instructions for determining that a block type of the second configuration block complies with one of the set of connectivity type rules for an outgoing edge of the number of outgoing edges for a block type of the first configuration block; and instructions for determining that the block type of the first configuration block complies with one of the set of connectivity type rules for an incoming edge of the number of incoming edges for the block type of the second configuration block.

10. The non-transitory computer readable storage medium of claim 7, wherein the instructions for modeling the existing dial plan as a directed graph further comprises:

instructions for identifying a number of subgraphs from the directed graph, wherein the number of subgraphs are identified by comparing the directed graph to a number of design templates.

11. The non-transitory computer readable storage medium of claim 10, further comprising:

instructions for building a new dial plan, wherein the new dial plan rectifies any non-compliances for edge rule compliance, and connectivity type compliance;

instructions for forwarding a template compliance and divergence information file to a user; and instructions for forwarding the new dial plan to the user.

12. The non-transitory computer readable storage medium of claim 7, wherein the instructions for analyzing the directed graph to determine compliance with a set of edge rules and instructions for analyzing the directed graph to determine compliance with a set of connectivity type rules further comprise:

instructions for analyzing the directed graph to determine compliance with a set of edge rules based on compliance of a number of subgraphs with a number of design templates; and instructions for analyzing the directed graph to determine compliance with a set of connectivity type rules based on compliance of the number of subgraphs with the number of design templates.

13. A data processing system comprising:

a storage having computer executable program code for analyzing a dial plan encoded thereon;

a bus system connecting the storage to a processor; and wherein the processor executes the computer executable program code to receive an existing dial plan; to model the existing dial plan as a directed graph, wherein the processor executing the computer executable program code to model the existing dial plan as a directed graph further comprises the processor executing the computer executable program code: to identify a block type for each of a set of configuration blocks of the directed graph; to identify a number of incoming edges for each of the set of configuration blocks of the directed graph; and to identify a number of outgoing edges for each of the set of configuration blocks of the directed graph; to analyze the directed graph to determine compliance with a set of edge rules, wherein the processor executing the computer executable program code to analyze the directed graph to determine compliance with a set of edge rules further comprises the processor executing the computer executable program code: to determine whether the number of incoming edges for each of the set of configuration blocks complies with an incoming edge rule for the block type for each of the set of configuration blocks, wherein the incoming edge rule identifies a maximum number of incoming edges for the block type for each of the set of configuration blocks, and wherein the incoming edge rule identifies a minimum number of incoming edges for the block type for each of the set of configuration blocks; and to determine whether the number of outgoing edges for each of the set of configuration blocks complies with an outgoing edge rule for the block type for each of the set of configuration blocks; and to analyze the directed graph to determine compliance with a set of connectivity type rules.

14. The data processing system of claim 13, wherein the outgoing edge rule identifies a maximum number of outgoing edges for the block type for each of the set of configuration blocks, and wherein the outgoing edge rule identifies a minimum number of outgoing edges for the block type for each of the set of configuration blocks.

15. The data processing system of claim 13, wherein the processor executing the computer executable program code to determine compliance with a set of connectivity type rules further comprises the processor executing the computer executable program code:

to identify a first configuration block of the set of configuration blocks; to identify a second configuration block of the set configuration blocks, wherein the second configuration block is pointed to from the first configuration block by one of the number of incoming edges; to determine that a block type of the second configuration block complies with one of the set of connectivity type rules for an outgoing edge of the number of outgoing edges for a block type of the first configuration block; and to determine that the block type of the first configuration block complies with one of the set of connectivity type rules for an incoming edge of the number of incoming edges for the block type of the second configuration block.

16. The data processing system of claim 13, wherein the processor executing the computer executable program code to model the existing dial plan as a directed graph further comprises the processor executing the computer executable program code:

to identify a number of subgraphs from the directed graph, wherein the number of subgraphs are identified by comparing the directed graph to a number of design templates.

17. A computer implemented method for creating a dial plan template, the computer implemented method comprising:

receiving, by a computer, an existing dial plan;

modeling, by the computer, the existing dial plan as a directed graph, wherein the step of modeling the existing dial plan as a directed graph further comprises: identifying a block type for each of a set of configuration blocks of the directed graph; identifying a number of incoming edges for each of the set of configuration blocks of the directed graph, wherein an incoming edge rule identifies a maximum number of incoming edges for the block type for each of the set of configuration blocks, and wherein the incoming edge rule identifies a minimum number of incoming edges for the block type for each of the set of configuration blocks; and identifying a number of outgoing edges for each of the set of configuration blocks of the directed graph;

identifying, by the computer, a number of subgraphs from the directed graph;

analyzing, by the computer, the number of subgraphs to determine a set of edge rules;

analyzing the directed graph to determine compliance with the set of edge rules by determining whether the number of incoming edges for each of the set of configuration blocks complies with an incoming edge rule for the block type for each of the set of configuration blocks, and by determining whether the number of outgoing edges for each of the set of configuration blocks complies with an outgoing edge rule for the block type for each of the set of configuration blocks; and analyzing, by the computer, the number of subgraphs to determine a set of connectivity type rules.

18. The computer implemented method of claim 17, further comprising:

recording a subgraph connectivity for each of the number of subgraphs in a number of template files; and storing the number of template files as ones of a number of design templates.

19. The computer implemented method of claim 17, wherein the step of modeling the existing dial plan as a directed graph further comprises:

identifying a block type for each of the set of configuration blocks of the directed graph;

identifying a number of incoming edges for each of the set of configuration blocks of the directed graph; and identifying a number of outgoing edges for each of the set of configuration blocks of the directed graph.

20. The computer implemented method of claim 19, wherein the step of analyzing the number of subgraphs to determine the set of edge rules and the set of connectivity rules further comprises:

recording rules in a number of template files; and storing the number of template files as ones of a number of design templates.

\* \* \* \* \*